US008217122B2

(12) United States Patent
Morita et al.

(10) Patent No.: US 8,217,122 B2
(45) Date of Patent: Jul. 10, 2012

(54) SILICONE RUBBER POWDER AND METHOD OF MANUFACTURING THEREOF

(75) Inventors: Yoshitsugu Morita, Chiba (JP); Kazuo Kobayashi, Chiba (JP); Ken Tanaka, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 12 days.

(21) Appl. No.: 12/675,508

(22) PCT Filed: Aug. 19, 2008

(86) PCT No.: PCT/JP2008/065067
§ 371 (c)(1),
(2), (4) Date: Feb. 26, 2010

(87) PCT Pub. No.: WO2009/028433
PCT Pub. Date: Mar. 5, 2009

(65) Prior Publication Data
US 2010/0216952 A1   Aug. 26, 2010

(30) Foreign Application Priority Data

Aug. 31, 2007   (JP) ................................ 2007-227139

(51) Int. Cl.
*C08J 3/24* (2006.01)
*C08G 77/12* (2006.01)

(52) U.S. Cl. .......................................... 525/478; 528/31
(58) Field of Classification Search ........................ None
See application file for complete search history.

(56) References Cited

U.S. PATENT DOCUMENTS

| 4,677,160 | A | * | 6/1987 | Kondo et al. | 524/860 |
| 4,742,142 | A | * | 5/1988 | Shimizu et al. | 528/15 |
| 4,782,112 | A | * | 11/1988 | Kondo et al. | 524/837 |
| 4,911,974 | A | * | 3/1990 | Shimizu et al. | 428/143 |
| 5,387,624 | A | * | 2/1995 | Morita et al. | 523/220 |
| 5,492,945 | A | * | 2/1996 | Morita et al. | 523/212 |
| 5,691,401 | A | * | 11/1997 | Morita et al. | 523/435 |
| 5,891,966 | A | * | 4/1999 | Murray et al. | 525/342 |
| 5,973,060 | A | * | 10/1999 | Ozaki et al. | 524/506 |
| 6,117,933 | A | * | 9/2000 | Ozaki et al. | 524/503 |
| 6,239,245 | B1 | * | 5/2001 | Morita et al. | 528/15 |
| 7,399,803 | B2 | * | 7/2008 | Morita et al. | 524/430 |
| 7,648,766 | B2 | * | 1/2010 | Morita | 428/403 |

FOREIGN PATENT DOCUMENTS

| EP | 0304946 A2 | 3/1989 |
| EP | 0365009 A2 | 4/1990 |
| EP | 0511833 A2 | 11/1992 |
| EP | 0548969 A1 | 6/1993 |
| EP | 0761791 A1 | 3/1997 |
| JP | 64-051467 A | 2/1989 |
| JP | 64-070558 A | 3/1989 |
| JP | 02-113079 A | 4/1990 |
| JP | 08-109262 A | 4/1996 |
| JP | 10-030050 A | 2/1998 |
| JP | 2007-138002 A | 6/2007 |
| WO | WO 2006-073055 A1 | 7/2006 |
| WO | WO 2009-028432 A1 | 3/2009 |

OTHER PUBLICATIONS

English language abstract for JP 64-051467 extracted from PAJ database, dated Jun. 15, 2010, 9 pages.
English language abstract for JP 64-070558 extracted from PAJ database, dated Jun. 15, 2010, 18 pages.
English language abstract for JP 02-113079 extracted from espacenet.com database, dated Jun. 18, 2010, 6 pages.
English language translation and abstract for JP 08-109262 extracted from PAJ database, dated Jun. 18, 2010, 71 pages.
English language translation and abstract for JP 10-030050 extracted from PAJ database, dated Jun. 15, 2010, 60 pages.
English language translation and abstract for JP 2007-138002 extracted from PAJ database, dated Jun. 15, 2010, 57 pages.
PCT International Search Report for PCT/JP2008/065066, dated Nov. 18, 2008, 4 pages.
PCT International Search Report for PCT/JP2008/065067, dated Dec. 4, 2008, 3 pages.
WO 2009-028432, Morita et al. published Mar. 5, 2009; equivalent to U.S. Appl. No. 12/675,499, filed Feb. 26, 2010.

* cited by examiner

*Primary Examiner* — Robert S Loewe
(74) *Attorney, Agent, or Firm* — Howard & Howard Attorneys PLLC

(57) ABSTRACT

A silicone rubber powder obtained by curing a condensation-curable silicone rubber composition in a dispersed state in water, having an epoxy equivalent measured by a titration method equal to or lower than 3,000 and an average particle size in the range of 0.1 to 100 μm; and a method of manufacturing a silicone rubber powder comprising the steps of dispersing in water a silicone rubber composition comprising at least components (A) through (C) listed below; adding component (D); and curing the mixture: (A) a diorganopolysiloxane capped at both molecular terminals with silanol groups and having in one molecule 30 or less silicon atoms; (B) an organopolysiloxane having in one molecule at least two silicon-bonded hydrogen atoms; (C) an epoxy-containing alkoxysilane; and (D) a condensation-reaction catalyst. The silicone rubber powder has low epoxy equivalent and possesses excellent dispersibility in organic resins, and the method is efficient in manufacturing of the aforementioned powder.

7 Claims, No Drawings

SILICONE RUBBER POWDER AND METHOD OF MANUFACTURING THEREOF

RELATED APPLICATIONS

This application claims priority to and all the advantages of International Patent Application No. PCT/US2008/065067, filed on Aug. 19, 2008, which claims priority to Japanese Patent Application No. JP2007-227139, filed on Aug. 31, 2007.

TECHNICAL FIELD

The present invention relates to a silicone rubber powder and to a method of manufacturing the same. More particularly, the invention relates to a silicone rubber powder having a low epoxy equivalent and excellent dispersibility in organic resins. The invention also relates to a method for efficient manufacturing of the aforementioned silicone rubber powder.

BACKGROUND ART

It is known that a silicone rubber powder that contains epoxy groups is used as an agent for improving properties of coatings, organic resin compositions, resins that are used as sealing agents for semiconductor devices, etc. In particular, silicone rubber powders obtained by a condensation reaction have much higher dispersibility in organic resins than similar powders obtained by an addition reaction. Silicone rubber powders obtained by a condensation reaction are known in the art. For example, Japanese Unexamined Patent Application Publications S64-70558, H02-113079 and H08-109262 disclose a silicone rubber powder obtained by curing an aqueously dispersed silicone rubber composition comprising a diorganopolysiloxane capped at both terminals with silanol groups, an organohydrogenpolysiloxane having in one molecule at least two silicon-bonded hydrogen atoms, an epoxy-containing alkoxysilane, and a condensation-reaction catalyst.

However, the aforementioned known silicone rubber powder has an epoxy equivalent that exceeds 3,000 (which means that the amount of epoxy groups introduced into this silicone rubber powder is low). Therefore, such a powder either has insufficient dispersibility in organic resins, or, when incorporated into a curable epoxy resin composition, does not provide sufficient decrease of modulus of elasticity in a product obtained by curing the composition. The inventors herein have undertaken a study aimed at finding reasons for which the epoxy groups cannot be introduced into the silicone rubber powder in a sufficient amount. The study revealed that this occurs because the de-alcoholation reaction that takes place between the silanol groups of the diorganopolysiloxane capped at both molecular terminals with silanol groups and the silicon-bonded alkoxy groups contained in the epoxy-containing alkoxysilane is preceded by a dehydration condensation reaction between the aforementioned silanol groups and the silicon-bonded hydrogen atoms contained in the organohydrogenpolysiloxane.

It is an object of the present invention to provide a silicone rubber powder that has a low epoxy equivalent and possesses excellent dispersibility in organic resins.

It is another object to provide a method for efficient manufacturing of the aforementioned silicone rubber powder.

DISCLOSURE OF INVENTION

A silicone rubber powder of the present invention is one obtained by curing a condensation-curable silicone rubber composition in a dispersed state in water and having an epoxy equivalent measured by a titration method equal to or lower than 3,000 and an average particle size in the range of 0.1 to 100 μm. The aforementioned powder has type-A durometer hardness according to JIS K 6253 equal to or greater than 50.

Furthermore, the silicone rubber condensation-curable silicone rubber composition used for forming the silicone rubber powder of the invention comprises the following components (A) through (D):

(A) a diorganopolysiloxane capped at both molecular terminals with silanol groups and having in one molecule 30 or less silicon atoms;
(B) an organopolysiloxane having in one molecule at least two silicon-bonded hydrogen atoms {used in such an amount that the mole number of silicon-bonded hydrogen atoms contained in this component becomes equal to or lower than 80% of the mole number of silanol groups in component (A)};
(C) an epoxy-containing alkoxysilane {used in such an amount that the mole number of silicon-bonded alkoxy groups contained in this component become equal to or greater than 40% of silanol groups remaining after subtraction of the mole number of the silicon-bonded hydrogen atoms of component (B) from the mole number of silanol groups of component (A)}; and
(D) a condensation-reaction catalyst {used in an amount of 0.01 to 5 parts by weight per 100 parts by weight of the sum of components (A) to (C)}.

A method of manufacturing the silicone rubber powder of the invention comprises the steps of dispersing in water a silicone rubber composition comprising components (A) through (C) listed below, adding component (D), and curing the mixture. It is preferable to add component (D) to the composition in a water-dispersed state:

(A) a diorganopolysiloxane capped at both molecular terminals with silanol groups and having in one molectile 30 or less silicon atoms;
(B) an organopolysiloxane having in one molecule at least two silicon-bonded hydrogen atoms {used in such an amount that the mole number of silicon-bonded hydrogen atoms contained in this component becomes equal to or lower than 80% of the mole number of silanol groups in component (A)};
(C) an epoxy-containing alkoxysilane {the mole number of silicon-bonded alkoxy groups contained in this component has a value at which the mole number of silanol groups remaining after subtraction of the mole number of the silicon-bonded hydrogen atoms of component (B) from the mole number of silanol groups of component (A) will become equal to or greater than 40%}; and
(D) a condensation-reaction catalyst {used in an amount of 0.01 to 5 parts by weight per 100 parts by weight of the sum of components (A) to (C)}.

Effects of Invention

The silicone rubber powder of the invention is efficient in that it has a low epoxy equivalent and excellent dispersibility in organic resins. The method of the invention is characterized by efficient production of the aforementioned silicone rubber composition.

DETAILED DESCRIPTION OF THE INVENTION

Let us first in more details the silicone rubber powder of the invention.

The silicone rubber powder of the invention has an epoxy equivalent determined by a titration method not exceeding 3000. This is because an epoxy equivalent exceeding 3000 will impair dispersibility of the powder in organic resins, and, when such a powder is added to a curable epoxy resin, the composition will not be able to sufficiently decrease modulus of elasticity in a product obtained by curing the composition. The epoxy resin equivalent of the silicone rubber powder is determined by uniformly dispersing the silicone rubber powder in a hydrochloric acid solution of dioxane, thus causing the epoxy groups to react with hydrochloric acid, and then determining the epoxy resin equivalent by back titrating the excess hydrochloric acid with sodium hydroxide.

The silicone rubber powder should have an average particle size in the range of 0.1 to 100 μm, preferably in the range of 0.1 to 50 μm, more preferably in the range of 0.1 to 30 μm, and most preferably, in the range of 0.1 to 20 μm. If the average particle size is below the recommended lower limit, this will increase the tendency of the powder particles to aggregation and impairs handlability of the powder. If, on the other hand, the average particle size exceeds the recommended upper limit, this will impair dispersibility of the powder in organic resins.

It is recommended that the silicone rubber powder has type-A durometer hardness according to JIS K 6253 equal to or greater than 50. The harder is the silicone rubber powder, the greater its dispersibility in organic resin. If the silicone rubber powder is compounded with a curable epoxy resin, in order to provide sufficient decrease in modulus of elasticity of a cured body of the composition, hardness of the powder should not exceed 90.

There are no special restrictions with regard to the shape of the powder particles, provided that they allow curing of the condensation-curable silicone rubber composition in an aqueously dispersed state. For example, the particles may have a substantially spherical, real spherical, or another suitable shape. It is further recommended that the condensation-curable silicone rubber composition comprises below-listed components (A) through (D):

(A) a diorganopolysiloxane capped at both molecular terminals with silanol groups and having in one molecule 30 or less silicon atoms;

(B) an organopolysiloxane having in one molecule at least two silicon-bonded hydrogen atoms {used in such an amount that the mole number of silicon-bonded hydrogen atoms contained in this component becomes equal to or lower than 80% of the mole number of silanol groups in component (A)};

(C) an epoxy-containing alkoxysilane {used in such an amount that the mole number of silicon-bonded alkoxy groups contained in this component become equal to or greater than 40% of silanol groups remaining after subtraction of the mole number of the silicon-bonded hydrogen atoms of component (B) from the mole number of silanol groups of component (A)}; and (D) a condensation-reaction catalyst {used in an amount of 0.01 to 5 parts by weight per 100 parts by weight of the sum of components (A) to (C)}.

The diorganopolysiloxane (A), which is the main component of the aforementioned composition, is capped at both molecular terminals with silanol groups and has in one molecule 30 or less silicon atoms. For more efficient introduction of epoxy groups into the obtained silicone rubber powder, it is recommended that the content of silicon atoms in one molecule of component (A) does not exceed 25, and preferably be 20 or below. If the silicone rubber powder is compounded with a curable epoxy resin, in order to provide sufficient decrease in modulus of elasticity of a cured body of the composition, one molecule of component (A) should contain at least two, preferably at least three, and most preferably, at least five silicon atoms.

The silicon-bonded groups contained in component (A) can be exemplified by substituted or unsubstituted monovalent hydrocarbon groups such as methyl, ethyl, propyl, butyl, pentyl, hexyl, heptyl, octyl, or similar alkyl groups; cyclopentyl, cyclohexyl, or similar cycloalkyl groups; vinyl, allyl, butenyl, or similar alkenyl groups; phenyl, tolyl, xylyl, or similar aryl groups; benzyl, phenethyl, 3-phenylpropyl, or similar aralkyl groups; 3-chloropropyl, and 3,3,3-trifluoropropyl, or similar halogenated alkyl groups. Preferable are alkyl, alkenyl, and aryl groups, especially, methyl, vinyl, and phenyl groups.

Aforementioned component (A) can be represented by the following compounds: a dimethylpolysiloxane capped at both molecular terminals with silanol groups, a copolymer of dimethylsiloxane and methylphenylsiloxane capped at both molecular terminals with silanol groups, a copolymer of methylvinylsiloxane and dimethylsiloxane capped at both molecular terminals with silanol groups, or a methylphenylpolysiloxane capped at both molecular terminals with silanol groups.

The organopolysiloxane of component (B) is used for cross-linking of the aforementioned composition. One molecule of this component may contain at least two and, preferably, at least three silicon-bonded hydrogen atoms. Other silicon-bonded groups of component (B) may be comprised of substituted or unsubstituted monovalent hydrocarbon groups such as methyl, ethyl, propyl, butyl, pentyl, hexyl, heptyl, octyl, or similar alkyl groups; cyclopentyl, cyclohexyl, or similar cycloalkyl groups; phenyl, tolyl, xylyl, or similar aryl groups; benzyl, phenethyl, 3-phenylpropyl, or similar aralkyl groups; 3-chloropropyl, and 3,3,3-trifluoropropyl, or similar halogenated alkyl groups. Preferable are alkyl, and aryl groups, especially, methyl, and phenyl groups. There are no special restrictions with regard to the molecular structure of component (B) which may have a linear, cyclic, net-like, or partially-branched linear structure. The linear molecular structure is preferable. Although there are no special restriction with regard to viscosity of component (B) at 25° C., provided that this viscosity allows dispersing of the obtained composition in water, it may be recommended to maintain viscosity in the range of 1 to 10,000 mPa·s, preferably in the range of 1 to 1,000 mPa·s, and most preferably, in the range of 1 to 100 mPa·s.

Aforementioned component (B) can be represented by the following compounds: a methylhydrogenpolysiloxane capped at both molecular terminals with trimethylsiloxy groups, a copolymer of methylhydrogensiloxane and dimethylsiloxane capped at both molecular terminals with trimethylsiloxy groups, a copolymer of methylhydrogensiloxane and dimethylsiloxane capped at both molecular terminals with dimethylhydrogensiloxy groups, a cyclic methylhydrogenpolysiloxane, or a cyclic copolymer of methylhydrogensiloxane and dimethylsiloxane.

Component (B) is added in such an amount at which the mole number of silicon-bonded hydrogen atoms contained in this component becomes equal to or lower than 80%, preferably in the range of 80% to 40%, and more preferably in the range of 70% to 40% than the mole number of silanol groups in component (A). If the content of component (B) is below the recommended lower limit, this will impair curability of the composition. If, on the other hand, the content of component (B) exceeds the recommended upper limit, it will be difficult to introduce a sufficient amount of epoxy groups into the obtained silicone rubber powder.

The epoxy-containing alkoxysilane that constitutes component (C) is used for introduction of epoxy groups into the obtained silicone rubber powder. Examples of alkoxy groups of component (C) are methoxy, ethoxy, propoxy, and methoxyethoxy groups. Most preferable from the viewpoint of high reactivity are methoxy and ethoxy groups. Epoxy groups of component (C) can be exemplified by 3-glycidoxypropyl or similar glycidoxy alkyl groups; 2-(3,4-epoxycyclohexyl)-ethyl, or similar epoxycyclohexylalkyl groups; 4-oxiranylbutyl, 8-oxiranyloctyl, or similar oxiranylalkyl groups. Component (C) may also contain other silicon-bonded groups, which may be represented by substituted or unsubstituted monovalent hydrocarbon groups such as methyl, ethyl, propyl, butyl, pentyl, hexyl, heptyl, octyl, or similar alkyl groups; cyclopentyl, cyclohexyl, or similar cycloalkyl groups; phenyl, tolyl, xylyl, or similar aryl groups; benzyl, phenethyl, 3-phenylpropyl, or similar aralkyl groups; 3-chloropropyl, and 3,3,3-trifluoropropyl, or similar halogenated alkyl groups.

Aforementioned component (C) can be exemplified by the following compounds: 3-glycidoxypropyl-trimethoxysilane, 3-glycidoxypropyltriethoxysilane, 3-glycidoxypropyl-methyldimethoxysilane, 2-(3,4-epoxycyclohexyl) ethyltrimethoxysilane, and 2-(3,4-epoxycyclohexyl) ethylmethyldimethoxysilane. Most preferable from the viewpoint of high reactivity are 3-glycidoxypropyltrimethoxysilane and 2-(3,4-epoxycyclohexyl) ethyltrimethoxysilane.

Component (C) should be added in such an amount that the mole number of silicon-bonded alkoxy groups contained in this component will have a value at which the mole number of silanol groups remaining after subtraction of the mole number of the silicon-bonded hydrogen atoms of component (B) from the mole number of silanol groups of component (A) will become equal to or greater than 40%, and preferably equal to or greater than 45%. If component (C) id added in an amount less than the recommended lower limit, it will be difficult to introduce epoxy groups to the obtained silicone rubber powder in a sufficient amount.

Component (D) is a condensation-reaction catalyst used for accelerating curing of the aforementioned composition. Examples of component (D) are the following: dibutyltin dilaurate, dibutyltin diacetate, tin octanoate, dibutyltin dioctate, tin laurate, or a similar organic tin compound; tetrabutyl titanate, tetrapropyl titanate, dibutoxybis(ethylacetoacetate) titanium, or a similar organic titanium compound, as well as hydrochloric acid, sulfuric acid, dodecylbenzenesulfonic acid, or a similar acidic compound; ammonia, sodium hydroxide, or a similar alkaline compound. Organic-tin and organic-titanium compounds are preferable.

Component (D) is added in an amount of 0.01 to 5 parts by weight, preferably 0.05 to 5 parts by weight, and most preferably 0.05 to 2 parts by weight per 100 parts by weight of the sum of components (A) through (C). If component (D) is added in an amount below the recommended lower limit, it will be difficult to provide complete curing of the obtained composition. If, on the other hands, the content of component (D) exceeds the recommended upper limit, it will be difficult to essentially accelerate curing.

In order to improve hardness and mechanical strength of the obtained silicone rubber powder, besides aforementioned component (C), the composition can be combined with an organoalkoxysilane or alkylsilicate. The organoalkoxysilane can be represented by methyltrimethoxysilane, ethyltrimethoxysilane, or phenyltrimethoxysilane. The alkylsilicate can be exemplified by methylsilicate or ethylsilicate. When reactivity of silicon-bonded alkoxy groups contained in the organoalkoxysilane or alkylsilicate used besides component (C) with respect to silanol groups is higher than reactivity of silicon-bonded alkoxy groups of component (C) with respect to silanol groups, there is a danger that the composition will not contain a sufficient amount of epoxy groups. Therefore, it is recommended to adjust the amount of the aforementioned additive so as to provide a sufficient amount of epoxy groups in the obtained powder.

In order to improve mechanical strength of the silicone rubber powder, the composition may also incorporate an arbitrary component in the form of filler. The filler may be comprised of silicon oxide, titanium oxide, aluminum oxide, zirconium oxide, antimony oxide, or a similar fine metal oxide powder; boron nitride, aluminum nitride, or a similar fine metal nitride powder; aluminum hydroxide, magnesium hydroxide, or a similar fine metal hydroxide powder; calcium carbonate, or a similar fine metal carbonate powder; nickel, cobalt, iron, copper, gold, silver, or a similar fine metal powder; finely powdered sulfide or chloride, or other fine inorganic powders having surfaces hydrophobized with organic silicon compounds such as organoalkoxysilane, organochlorosilane, organosilazane, or the like. Preferable fillers are fine metal oxide powders, which are readily available, especially finely powdered silica.

The following is a more detailed description of the method of the invention for manufacturing the aforementioned silicone rubber powder.

First, according to the manufacturing method of the invention, a silicone rubber composition comprising the below-listed components (A) through (C) is dispersed in water:
 (A) a diorganopolysiloxane capped at both molecular terminals with silanol groups and having in one molecule 30 or less silicon atoms;
 (B) an organopolysiloxane having in one molecule at least two silicon-bonded hydrogen atoms {used in such an amount that the mole number of silicon-bonded hydrogen atoms contained in this component becomes equal to or lower than 80% of the mole number of silanol groups in component (A)};
 (C) an epoxy-containing alkoxysilane {used in such an amount that the mole number of silicon-bonded alkoxy groups contained in this component become equal to or greater than 40% of silanol groups remaining after subtraction of the mole number of the silicon-bonded hydrogen atoms of component (B) from the mole number of silanol groups of component (A)}.

Components (A) through (C) were described earlier. Furthermore, as has been mentioned above, in order to improve hardness and mechanical strength of the obtained silicone rubber powder, the composition may be combined with arbitrary components in the form of the aforementioned organoalkoxysilane, alkylsilicate, or filler.

In order to improve stability and dispersibility in water, the composition may additionally be combined with a surfactant. The aforementioned surfactant may be of a nonionic type, cationic type, or of a betaine type. The particle size of the obtained silicone rubber powder will dependent on the type and the added amount of the surfactant. In order to obtain a silicone rubber powder with particles of a reduced size, it is recommended to add the surfactant in an amount of 0.5 to 50 parts by weight per 100 parts by weight of the composition. On the other hand, in order to increase the size of the particles, the amount of the surfactant added to the composition should be in the range of 0.1 to 10 parts by weight. It is recommended that water be used in an amount of 20 to 1,500 parts by weight per 100 parts by weight of the composition.

The composition of the invention can be uniformly dispersed in water by means of an emulsifier. The emulsifier can be represented by Homo Mixer®, a paddle-type mixer, Henschel Mixer®, Homo Disper®, colloidal mill, propeller-type stirrer, homogenizer, continuous action in-line emulsifier, ultrasonic emulsifier, or a vacuum-type kneader.

According to the manufacturing method of the invention, the aforementioned composition is cured by adding to the composition consisting of components (A) through (C) a condensation reaction catalyst (D) in an amount of 0.01 to 5 parts by weight per 100 parts by weight of the sum of components (A) through (C). Component (D) was described earlier. In order to accelerate curing of the composition, component (D) can be added to the composition in a state preliminarily dispersed in water, and preferably in the form of an aqueous dispersion having an average particle size not exceeding 10 μm.

After the composition is cured, the silicone rubber powder is obtained in the form of an aqueous suspension. Therefore, the powder can be recovered by removing water from the suspension. This can be done by concentrating the suspension with thermal dehydration, filtration, centrifugal separation, or decantation, or by other methods, if necessary, with subsequent washing, and then by hot drying under normal or reduced pressure, spraying the suspension into a flow of hot air, or by heating with the use of a flowing heating medium.

EXAMPLES

The silicone rubber powder and the manufacturing method of the invention will now be described in more details with reference to practical and comparative examples. All characteristics given in the examples have values corresponding to 25° C. Characteristics of the silicone rubber powder were measured by the methods described below.

[Epoxy Equivalent]

A silicone rubber powder in an amount of about 2 g was accurately weighed, loaded into a 100 ml-flask with a ground stopper. A suspension was then prepared by accurately adding 10 ml of a dioxane-hydrochloric-acid solution (prepared directly prior to use by dissolving 1.5 ml of concentrated hydrochloric acid in 100 ml of pure dioxane). After retaining for 10 min. in a quiescent state, the suspension was combined with about 20 to 30 ml of neutral ethyl alcohol. The excess of the hydrochloric acid was titrated with a 0.1N solution of caustic soda by using phenolphthalein as a indicator, and then the content of epoxy groups in the silicone rubber powder was determined. The epoxy equivalent of the silicone rubber powder was determined from the amount of the epoxy groups and the weight of the silicone rubber powder.

[Average Particle Size]

Diameters of the particles were measures with a Model LA-500 laser diffraction particle distribution measurement instrument made by Horiba, Ltd. The median diameter obtained (i.e., a particle diameter corresponding to 50% of the accumulated distribution) was defined as the average diameter of a cross-linked silicone particle.

[Type A Durometer Hardness]

The silicone rubber composition was mixed with a condensation-reaction catalyst, and after defoaming, the suspension was allowed to stand for 1 day at 25° C. and used for manufacturing a 1 mm-thick silicone rubber sheet. The type A durometer hardness of the sheet was measured according to JIS K 6253 (1997) by using a Wallace microhardness meter H5B manufactured by H. W. Wallace Co.

Practical Example 1

A silicone rubber composition was prepared by uniformly mixing the following components: 86.4 parts by weight of a dimethylpolysiloxane having viscosity of 40 mPa·s and capped at both molecular terminals with silanol groups (content of silanol groups: 4.0 wt. %; on average 12 silicon atoms in one molecule); 9.1 parts by weight of a methylhydrogenpolysiloxane having viscosity of 10 mPa·s and capped at both molecular terminals with trimethylsiloxy groups (content of silicon-bonded hydrogen atoms: 1.5 wt. %); and 4.5 parts by weight of 3-glycidoxypropyl trimethoxysilane. After premixing 97 parts by weight of water with 5 parts by weight of a mixture obtained by mixing the obtained composition with secondary tridecyl ether and secondary dodecyl ether (7 mole addition) (43 wt. % of dodecyl groups, 57 wt. % of tridecyl groups; HLB=12.8), the product was emulsified in a colloidal mill, and diluted with 100 parts by weight of pure water, whereby an aqueous emulsion of a silicone rubber composition was obtained.

Next, an aqueous emulsion of a tin octoate having an average particle size of about 1.2 μm was prepared by emulsifying a mixture of 1 part by weight of a tin (II) octoate, a secondary tridecyl ether, and secondary dodecyl ether (7 mole addition) (43 wt. % of dodecyl groups, 57 wt. % of tridecyl groups; HLB=12.8) in 10 parts by weight of water. The obtained aqueous emulsion was added to and uniformly mixed with the aforementioned aqueous emulsion of the composition. The product was retained in quiescence for 1 day, and then the silicone rubber composition emulsified in water was cured to produce a gel-free uniform aqueous suspension of the silicone rubber powder. A silicone rubber powder was produced by drying the obtained aqueous suspension in a hot-air dryer. Results of measurement of an epoxy equivalent, an average particle size, and type A hardness of the silicone rubber powder are shown in Table 1.

Practical Example 2

A silicone rubber powder was prepared by the same method as in Practical Example 1, except that the 3-glycidoxypropyl trimethoxysilane was used in the amount of 10.0 parts by weight. Results of measurement of an epoxy equivalent, an average particle size, and type A hardness of the silicone rubber powder are shown in Table 1.

Comparative Example 1

A silicone rubber powder was prepared by the same method as in Practical Example 1, except that a dimethylpolysiloxane having viscosity of 80 mPa·s and capped at both molecular terminals with silanol groups (content of silanol groups: 1.1 wt. %; an average number of silicon atoms in one molecule: about 40) was used instead of dimethylpolysiloxane having viscosity of 40 mPa·s and capped at both molecular terminals with silanol groups (content of silanol groups: 4.0 wt. %; on average 12 silicon atoms in one molecule). Results of measurement of an epoxy equivalent, an average particle size, and type A hardness of the silicone rubber powder are shown in Table 1.

Comparative Example 2

A silicone rubber powder was prepared by the same method as in Practical Example 1, except that a dimethylpolysiloxane having viscosity of 80 mPa·s and capped at both molecular terminals with silanol groups (content of silanol groups: 1.1 wt. %; an average number of silicon atoms in one molecule: about 40) and 10 parts by weight of 3-glycidoxypropyl trimethoxysilane additionally introduced to the composition were used instead of dimethylpolysiloxane having viscosity of 40 mPa·s and capped at both molecular terminals with silanol groups (content of silanol groups: 4.0 wt. %; on average 12 silicon atoms in one molecule). Results of measurement of an epoxy equivalent, an average particle size, and type A hardness of the silicone rubber powder are shown in Table 1.

TABLE 1

|  | Examples | | | |
| --- | --- | --- | --- | --- |
|  | Practical Examples | | Comparative Examples | |
| Characteristics | 1 | 2 | 1 | 2 |
| Epoxy equivalent | 2800 | 2500 | 4900 | 3800 |
| Average particle size (μm) | 1.9 | 1.8 | 2.6 | 2.3 |
| Particle size distribution (μm) | 0.1 to 40 | 0.1 to 40 | 0.1 to 100 | 0.1 to 80 |
| 90% accumulated particle size (μm) | 3.0 | 3.0 | 6.5 | 5.5 |
| Type A durometer hardness | 67 | 68 | 40 | 42 |

Next, the aforementioned silicone rubber powder was compounded with a curable epoxy resin composition, and properties of a cured body obtained from the composition were evaluated. The properties of the curable epoxy resin composition and of a cured body thereof were measured by methods described below. The curable epoxy resin composition was subjected to transfer press molding for 2 min. at a temperature of 175° C. under a pressure of 70 kgf/cm², and then to after curing for 5 hours at 180° C.

Spiral flow: measured in accordance with EMMI standard at a temperature of 175° C. under a pressure of 70 kgf/cm².

Flexural modulus of elasticity: measured in accordance with JIS K 6911;

Flexural strength: measured in accordance with JIS K 6911.

Application Example 1

A curable epoxy resin composition was obtained by fusing and uniformly mixing the following components between two hot rolls: 51.7 parts by weight of a biphenyl-aralkyl type epoxy resin (NC3000, the product of Nippon Kayaku Co., Ltd.; epoxy equivalent=275, melting point=56° C.); 38.3 parts by weight of a biphenyl-aralkyl type phenolic resin (MEH7851M, the product of Meiwa Plastic Industries, Ltd., equivalent of phenolic hydroxyl groups=207, melting point=80° C.); 9 parts by weight of the silicone rubber powder obtained in Practical Example 1; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 2.

Application Example 2

A curable epoxy resin composition was obtained by fusing and uniformly mixing the following components between two hot rolls: 51.88 parts by weight of a biphenyl-aralkyl type epoxy resin (NC3000, the product of Nippon Kayaku Co., Ltd.; epoxy equivalent=275, melting point=56° C.); 38.12 parts by weight of a biphenyl-aralkyl type phenolic resin (MEH7851M, the product of Meiwa Plastic Industries, Ltd., equivalent of phenolic hydroxyl groups=207, melting point=80° C.); 18 parts by weight of the silicone rubber powder obtained in Practical Example 1; 510 parts by weight of amorphous spherical silica with an average particle size of 14 μm (FB-48X, the product of Denki Kagaku Kogyo Co., Ltd.); 1 part by weight of triphenylphosphine; and 1 part by weight of carnauba wax. The results of evaluation of the obtained epoxy resin composition and cured bodies produced by curing the composition are shown in Table 2.

Application Example 3

A curable epoxy resin composition was obtained by fusing and uniformly mixing the following components between two hot rolls: 52.07 parts by weight of a biphenyl-aralkyl type epoxy resin (NC3000, the product of Nippon Kayaku Co., Ltd.; epoxy equivalent=275, melting point=56° C.); 37.93 parts by weight of a biphenyl-aralkyl type phenolic resin (MEH7851M, the product of Meiwa Plastic Industries, Ltd., equivalent of phenolic hydroxyl groups=207, melting point=80° C.); 27 parts by weight of the silicone rubber powder obtained in Practical Example 1; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 2.

Application Example 4

A curable epoxy resin composition was obtained by fusing and uniformly mixing the following components between two hot rolls: 51.3 parts by weight of a biphenyl-aralkyl type epoxy resin (NC3000, the product of Nippon Kayaku Co., Ltd.; epoxy equivalent=275, melting point=56° C.); 38.7 parts by weight of a biphenyl-aralkyl type phenolic resin (MEH7851M, the product of Meiwa Plastic Industries, Ltd., equivalent of phenolic hydroxyl groups=207, melting point=80° C.); 9 parts by weight of the silicone rubber powder obtained in Comparative Example 1; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 2.

Application Example 5

A curable epoxy resin composition was obtained by fusing and uniformly mixing the following components between two hot rolls: 51.09 parts by weight of a biphenyl-aralkyl type epoxy resin (NC3000, the product of Nippon Kayaku Co., Ltd.; epoxy equivalent=275, melting point=56° C.); 38.91 parts by weight of a biphenyl-aralkyl type phenolic resin (MEH7851M, the product of Meiwa Plastic Industries, Ltd., equivalent of phenolic hydroxyl groups=207, melting point=80° C.); 18 parts by weight of the silicone rubber powder obtained in Comparative Example 1; 510 parts by weight of amorphous spherical silica with an average particle size of 14 μm (FB-48X, the product of Denki Kagaku Kogyo Kabushiki kaisha); 1 part by weight of triphenylphosphine; and 1 part by weight of carnauba wax. The results of evaluation of the obtained epoxy resin composition and cured bodies produced by curing the composition are shown in Table 2.

Application Example 6

A curable epoxy resin composition was obtained by fusing and uniformly mixing the following components between two hot rolls: 50.88 parts by weight of a biphenyl-aralkyl type epoxy resin (NC3000, the product of Nippon Kayaku Co., Ltd.; epoxy equivalent=275, melting point=56° C.); 39.12 parts by weight of a biphenyl-aralkyl type phenolic resin (MEH7851M, the product of Meiwa Plastic Industries, Ltd., equivalent of phenolic hydroxyl groups=207, melting point=80° C.); 27 parts by weight of the silicone rubber powder obtained in Comparative Example 1; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 2.

Application Example 7

A curable epoxy resin composition was obtained by fusing and uniformly mixing the following components between two hot rolls: 51.3 parts by weight of a biphenyl-aralkyl type epoxy resin (NC3000, the product of Nippon Kayaku Co., Ltd.; epoxy equivalent=275, melting point=56° C.); 38.7 parts by weight of a biphenyl-aralkyl type phenolic resin (MEH7851M, the product of Meiwa Plastic Industries, Ltd., equivalent of phenolic hydroxyl groups=207, melting point=80° C.); 9 parts by weight of the silicone rubber powder obtained in Comparative Example 2; 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 2.

Application Example 8

A curable epoxy resin composition was obtained by fusing and uniformly mixing the following components between two hot rolls: 51.51 parts by weight of a biphenyl-aralkyl type epoxy resin (NC3000, the product of Nippon Kayaku Co., Ltd.; epoxy equivalent=275, melting point=56° C.); 39.49 parts by weight of a biphenyl-aralkyl type phenolic resin (MEH7851M, the product of Meiwa Plastic Industries, Ltd., equivalent of phenolic hydroxyl groups=207, melting point=80° C.); 510 parts by weight of amorphous spherical silica with an average particle size of 14 μm (FB-48X, the product of Denki Kagaku Kogyo Kabushiki Kaisha); 1 part by weight of triphenylphosphine; and 1 part by weight of carnauba wax. The results of evaluation of the obtained epoxy resin composition and cured bodies produced by curing the composition are shown in Table 2.

INDUSTRIAL APPLICABILITY

Since the silicone rubber powder of the invention possesses excellent dispersibility in organic resins, it is suitable for use as an organic-resin additive employed for improving moldability, lubricating properties, mold-separation properties, inner-stress relaxation characteristics, tactility, etc. More specifically, the silicone rubber powder may be used as an additive to coating materials, thermosetting resin compositions, thermoplastic resin compositions, etc., or as a surface-lubricating agent for plastic films. In particular, since the proposed silicone rubber composition has low epoxy equivalent, admixing thereof with curable epoxy resin compositions makes it possible to reduce modulus of elasticity and stress in products obtained by curing the composition.

The invention claimed is:

1. A silicone rubber powder obtained by curing a condensation-curable silicone rubber composition in a dispersed state in water, the powder having an epoxy equivalent measured by titration equal to or lower than 3,000 and an average particle size in the
    range of 0.1 to 100 μm, wherein the condensation-curable silicone rubber compostition comprises the following components (A) through (D):
    (A) a diorganopolysiloxane capped at both molecular terminals with silanol groups and having in one molecule 30 or less silicon atoms;
    (B) an organopolysiloxane having in one molecule at least two silicon-bonded hydrogen atoms wherein the mole number of silicon-bonded hydrogen atoms contained in this component becomes equal to or lower than 80% of the mole number of silanol groups in component (A);
    (C) an epoxy-containing alkoxysilane wherein the mole number of silicon-bonded alkoxy groups contained in this component becomes equal to or greater than 40% of the mole number of silanol groups remaining after subtraction of the mole number of the silicon-bonded hydrogen atoms of component (B) from the mole number silanol groups of component (A); and
    (D) a condensation-reaction catalyst used in an amount of 0.01 to 5 parts by weight per 100 parts by weight of the sum of components(A) to (C).

2. The silicone rubber powder according to claim 1 having type-A durometer hardness according to JIS K 6253 equal to or greater than 50.

3. The silicone rubber powder according to claim 1 having an average particle size in the range of 0.1 to 50 μm.

4. The silicone rubber powder according to claim 1 having an average particle size in the range of 0.1 to 30 μm.

5. The silicone rubber powder according to claim 1 having type-A durometer hardness according to JIS K 6253 in the range from 50 to 90.

6. A method of manufacturing a silicone rubber powder comprising the steps of dispersing in water a silicone rubber composition comprising components (A) through (C) listed below; adding component (D); and curing the mixture, the composition being characterized by the fact that the epoxy

TABLE 2

| | Application Examples | | | | | | | |
|---|---|---|---|---|---|---|---|---|
| | 1 | 2 | 3 | 4 | 5 | 6 | 7 | 8 |
| Spiral flow (inch) | 10 | 10 | 10 | 12 | 11 | 9 | 12 | 13 |
| Flexural modulus of elasticity (kgf/mm$^2$) | 1880 | 1700 | 1500 | 1870 | 1615 | 1530 | 1870 | 2170 |
| Flexural strength (kgf/mm$^2$) | 15.9 | 13.8 | 12.1 | 14.6 | 12.9 | 10.4 | 14.6 | 17.2 | equivalent thereof measured by a titration method is equal to or lower than 3,000 and that the average particle size of rubber powder particles is in the range of 0.1 to 100 μm:
- (A) a diorganopolysiloxane capped at both molecular terminals with silanol groups and having in one molecule 30 or less silicon atoms;
- (B) an organopolysiloxane having in one molecule at least two silicon-bonded hydrogen atoms wherein the mole number of silicon-bonded hydrogen atoms contained in this component becomes equal to or lower than 80% of the mole number of silanol groups in component (A);
- (C) an epoxy-containing alkoxysilane wherein the mole number of silicon-bonded alkoxy groups contained in this component becomes equal to or greater than 40% of the mole number of silanol groups remaining after subtraction of the mole number of the silicon-bonded hydrogen atoms of component (B) from the mole number of silanol groups of component (A); and
- (D) a condensation-reaction catalyst in an amount of 0.01 to 5 parts by weight per 100 parts by weight of the sum of components (A) to (C).

7. The method of claim 6, wherein component (D) is added in a water-dispersed state.

* * * * *